Patented Feb. 4, 1930

1,745,962

UNITED STATES PATENT OFFICE

LIVINGSTON A. THOMPSON, OF WAUKESHA, WISCONSIN

PROCESS OF MAKING CHEESE

No Drawing.   Application filed October 21, 1927. Serial No. 227,852.

This invention relates to a process of making cheese and to the resulting product.

Objects of this invention are to provide a novel form of palatable, easily digestible and nutritious cheese which is combined with malt wort, so that the easily digested and assimilable proteins in the wort are carried by the cheese and are occluded by the coagulated casein.

Further objects are to provide a cheese in which the mineral salts, enzymes, dextrin, and maltose are carried within the body of the cheese and are thoroughly incorporated therewith, and in which a partial digestion of the casein has been accomplished by the proteolytic enzymes of the malt wort, such wort containing both enzymes of this type and also the diastatic enzymes.

Further objects are to provide a novel process of making cheese which has very much the characteristics of Cheddar cheese, but which has the additional characteristics discussed above.

Further objects are to provide a process of combining the malt wort with the milk and causing subsequent coagulation to take place so as to occlude a large percentage of the suspended proteins, and to maintain the temperatures such that the partial digestion of a part of the casein will be secured.

In carrying out this process the steps are approximately as follows:

The milk is heated to a temperature from 115° F. to 120° F., and the malt wort is added of an amount of about 20 per cent that of the milk. This temperature is maintained for a period of approximately thirty minutes after the addition of the malt wort. The mixture is then cooled to approximately 90° F.

Thereafter, rennet is added to coagulate the casein and after the curd has been formed, the curd may be treated in any of the usual ways in which Cheddar cheese is produced. For example, the curd may be either cut or broken and salt may be added, and thereafter the curd may be cooked at a temperature of from 98° to 100° F. Subsequently, the cheese is put in the press and the excess liquid removed. The cheese may then be stored and, if desired, it may be dipped in melted paraffin, with the paraffin heated to approximately 180°. It is immersed in the paraffin for from four to six seconds and is immediately removed. The paraffin, it has been found, aids in the prevention of mold. Further than this, it maintains the cheese in its proper consistency and prevents evaporation of moisture. The cheese may be stored in a refrigerating chamber, if desired, to allow additional slow curing to take place.

It will be seen that a novel process of making cheese has been provided by this invention in which malt wort is combined with the cheese at a certain stage in the process of making the cheese, as has been outlined above, so that the beneficial elements of the malt wort are utilized in increasing the food value and palatability of the cheese.

It is to be noted further that by heating the milk to the proper temperature and then adding the wort and maintaining the mixture at this temperature for the required period, that a part of the casein will be acted upon and partially digested by the proteolytic enzymes of the malt wort.

It will be seen further that a novel product has been produced by this invention which has all of the desirable characteristics of cheese, particularly of the Cheddar variety, and which also has the additional nutritive features noted above, as well as an improvement in the palatability of the cheese.

Further, it is to be noted that the process produces a very easily digestible and nutritious food.

Although the invention has been described in considerable detail, such description is intended as illustrative rather than limiting as the invention may be variously embodied and as the scope of such invention is to be determined as claimed.

I claim:

1. The process of making cheese comprising heating milk and adding malt wort thereto, maintaining the heated condition of the mixture for a period to allow the enzymes of the wort to partially digest the casein, adding a coagulating agent to cause the malt wort to be occluded by the coagulated casein, and subsequently pressing and storing the cheese.

2. The process of making cheese comprising heating milk to approximately 115° F. to 120° F., adding approximately 20 per cent of malt wort, maintaining the mixture at approximately 115° F. to 120° F. for about thirty minutes, thereafter cooling the mixture to approximately 90° and adding rennet, and subsequently extracting the excess moisture from the curd by pressing.

3. A cheese having the compounds of malt wort incorporated therein and having a portion of its casein in a partially digested state.

In testimony that I claim the foregoing I have hereunto set my hand.

LIVINGSTON A. THOMPSON.